US011604345B2

(12) United States Patent
Pang et al.

(10) Patent No.: US 11,604,345 B2
(45) Date of Patent: Mar. 14, 2023

(54) APPARATUSES AND METHODS FOR BACKSCATTERING ELIMINATION VIA SPATIAL AND TEMPORAL MODULATIONS

(71) Applicants: Stanley Electric Co., Ltd., Tokyo (JP); LinOptx, LLC, San Diego, CA (US)

(72) Inventors: Lin Pang, San Diego, CA (US); Tomofumi Yamamuro, San Diego, CA (US)

(73) Assignees: STANLEY ELECTRIC CO., LTD., Tokyo (JP); LINOPTX, LLC, San Diego, CA (US)

( * ) Notice: Subject to any disclaimer, the term of this patent is extended or adjusted under 35 U.S.C. 154(b) by 631 days.

(21) Appl. No.: 16/708,641

(22) Filed: Dec. 10, 2019

(65) Prior Publication Data

US 2020/0241136 A1    Jul. 30, 2020

Related U.S. Application Data

(60) Provisional application No. 62/797,363, filed on Jan. 28, 2019, provisional application No. 62/797,366, filed on Jan. 28, 2019.

(51) Int. Cl.
*G02B 26/08*    (2006.01)
*G02F 1/01*    (2006.01)
(Continued)

(52) U.S. Cl.
CPC ....... *G02B 26/0833* (2013.01); *B60Q 1/1407* (2013.01); *B60Q 1/1423* (2013.01);
(Continued)

(58) Field of Classification Search
CPC .. G02B 5/1819; G02B 5/1857; G02B 6/0035; G02B 6/266; G02B 6/2773;
(Continued)

(56) References Cited

U.S. PATENT DOCUMENTS 10,368,752 B1 *  8/2019  Alford .............. A61B 5/14542
2015/0009695 A1   1/2015  Christmas et al.
(Continued)

FOREIGN PATENT DOCUMENTS

DE    102011017644 A1 * 10/2012  ........... B60Q 1/0023
DE    102013210890 A1 * 12/2014  ........... G01S 13/867
(Continued)

OTHER PUBLICATIONS

Extended European search report dated Mar. 23, 2021, in corresponding European patent Application No. 20212289.1, 8 pages.

*Primary Examiner* — Michael P Stafira
(74) *Attorney, Agent, or Firm* — Xsensus LLP

(57) ABSTRACT

An image capture apparatus includes a light source, a modulator configured to modulate light irradiated from the light source to a target object, an imaging device configured to generate image data by capturing one or more images of the target object, and processing circuitry. The processing circuitry is configured to drive the modulator by a first modulation signal, the first modulation signal being for irradiating a first pattern, drive the modulator by a second modulation signal, the second signal being for irradiating a second pattern, wherein the first pattern and the second pattern are irradiated alternately, modulate reflected light from the target object, the reflected light from the target object being detected at a lock-in detector, and generate an image composed of image data from the reflected light of the plurality of localized illuminations.

17 Claims, 13 Drawing Sheets

(51) Int. Cl.
| | |
|---|---|
| F21S 41/16 | (2018.01) |
| F21S 41/125 | (2018.01) |
| F21S 41/60 | (2018.01) |
| F21V 9/30 | (2018.01) |
| B60Q 1/14 | (2006.01) |
| F21V 9/08 | (2018.01) |
| F21V 9/14 | (2006.01) |
| F21V 14/00 | (2018.01) |
| H04N 5/225 | (2006.01) |
| G01S 17/04 | (2020.01) |
| B60Q 1/20 | (2006.01) |
| G01N 21/47 | (2006.01) |
| G01S 17/10 | (2020.01) |
| H04N 5/272 | (2006.01) |
| G01S 17/89 | (2020.01) |
| G01S 17/931 | (2020.01) |
| G01S 7/497 | (2006.01) |
| G03B 21/00 | (2006.01) |
| F21Y 115/30 | (2016.01) |
| F21Y 115/10 | (2016.01) |
| F21W 102/20 | (2018.01) |
| G01J 3/28 | (2006.01) |

(52) U.S. Cl.
CPC .............. *B60Q 1/20* (2013.01); *F21S 41/125* (2018.01); *F21S 41/16* (2018.01); *F21S 41/60* (2018.01); *F21V 9/08* (2013.01); *F21V 9/14* (2013.01); *F21V 9/30* (2018.02); *F21V 14/003* (2013.01); *G01N 21/4795* (2013.01); *G01S 7/497* (2013.01); *G01S 17/04* (2020.01); *G01S 17/10* (2013.01); *G01S 17/89* (2013.01); *G01S 17/931* (2020.01); *G02F 1/0105* (2013.01); *G03B 21/008* (2013.01); *H04N 5/2256* (2013.01); *H04N 5/272* (2013.01); *F21W 2102/20* (2018.01); *F21Y 2115/10* (2016.08); *F21Y 2115/30* (2016.08); *G01J 2003/285* (2013.01)

(58) Field of Classification Search
CPC ............ G02B 6/29311; G02B 6/29385; G02B 6/29394; G02B 6/29395; G02B 6/3512; G02B 6/3518; G02B 6/3526; G02B 6/3554; G02B 7/00; G02B 1/041; G02B 1/11; G02B 1/14; G02B 13/0095; G02B 17/02; G02B 19/00; G02B 19/0057; G02B 19/0095; G02B 2003/0093; G02B 2027/0183; G02B 21/00; G02B 21/02; G02B 21/125; G02B 21/18; G02B 2207/114; G02B 26/00; G02B 26/108; G02B 26/123; G02B 27/0179; G02B 27/0944; G02B 27/1026; G02B 27/104; G02B 27/1093; G02B 27/145; G02B 27/4227; G02B 27/60; G02B 30/25; G02B 30/26; G02B 30/28; G02B 30/36; G02B 5/1866; G02B 6/0011; G02B 6/0036; G02B 6/0038; G02B 6/1226; G02B 6/425; G02B 7/008; F21S 41/16; F21S 41/125; F21S 41/60; F21S 41/176; F21S 8/033; F21S 8/061; F21S 41/663; F21S 41/141; F21S 41/36; F21S 41/143; F21S 41/00; F21S 41/153; F21S 41/24; F21S 41/255; F21S 41/265; F21S 41/322; F21S 41/365; F21S 45/47; F21S 41/155; F21S 41/25; F21S 41/645; F21S 41/14; F21S 41/147; F21S 41/321; F21S 41/40; F21S 41/43; F21S 41/65; F21V 29/505; F21V 7/24; F21V 7/28; F21V 9/04; F21V 9/06; F21V 14/003; F21V 9/08; F21V 9/14; F21V 9/30; F21V 23/0478; F21V 29/67; F21V 29/763; F21V 29/81; F21V 33/0012; F21V 29/767; F21V 5/045
See application file for complete search history.

(56) References Cited

U.S. PATENT DOCUMENTS

| | | | |
|---|---|---|---|
| 2016/0216507 A1* | 7/2016 | Danehy | G03B 9/08 |
| 2017/0067734 A1* | 3/2017 | Heidemann | G01C 15/00 |
| 2018/0302542 A1 | 10/2018 | Masumura | |
| 2018/0313510 A1* | 11/2018 | Albou | F21S 41/285 |
| 2019/0329699 A1* | 10/2019 | Neukam | G06V 20/58 |

FOREIGN PATENT DOCUMENTS

| | | | | |
|---|---|---|---|---|
| DE | 102014006760 A1 | * | 11/2015 | ........... G01S 17/107 |
| DE | 102016006390 A1 | * | 11/2017 | ............. B60Q 1/085 |
| EP | 2199152 A1 | * | 6/2010 | ............. B60Q 1/085 |
| JP | 2019-027974 A | | 2/2019 | |
| JP | 2019-092088 A | | 6/2019 | |
| WO | WO-2007071032 A1 | * | 6/2007 | ........... B60Q 1/0023 |
| WO | WO-2017016533 A1 | * | 2/2017 | ........... G01S 17/003 |

* cited by examiner

APPARATUSES AND METHODS FOR BACKSCATTERING ELIMINATION VIA SPATIAL AND TEMPORAL MODULATIONS

CROSS-REFERENCE TO RELATED APPLICATION

This application claims the benefit of U.S. Provisional Application Nos. 62/797,363 filed Jan. 28, 2019, and 62/797,366, filed Jan. 28, 2019, which are incorporated herein by reference in their entirety. Additionally, related applications, 13060US01, 13061US01, and 13241WO01, are herein incorporated by reference in their entirety.

BACKGROUND

When driving in heavy fog conditions, various traffic information cannot be seen clearly. For example, visibility of road signs, street lines, cars in front of the driver, and the like can be limited due to the fog. This limited visibility often triggers the driver to switch on the high-beam headlamp which makes this situation even worse. Bright light due to the backscattered light from the fog particles glares in front of the driver. Even if the driver does not use the high-beam headlamp and relies on something like fog lamps which are included in some cars as a safety feature, visibility in fog (or other scattering mediums like rain, snow, pollution, dust, etc.) is still limited.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

SUMMARY

According to aspects of the disclosed subject matter, an image capture apparatus includes a light source, a modulator configured to modulate light irradiated from the light source to a target object, an imaging device configured to generate image data by capturing one or more images of the target object, and processing circuitry. The processing circuitry is configured to drive the modulator by a first modulation signal, the first modulation signal being for irradiating a first pattern, drive the modulator by a second modulation signal, the second signal being for irradiating a second pattern, wherein the first pattern and the second pattern are irradiated alternately, modulate reflected light from the target object while demodulate light backscattered from the fog, the reflected light from the target object being detected at a lock-in detector, and generate an image composed of image data from the reflected light of the plurality of localized illuminations.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
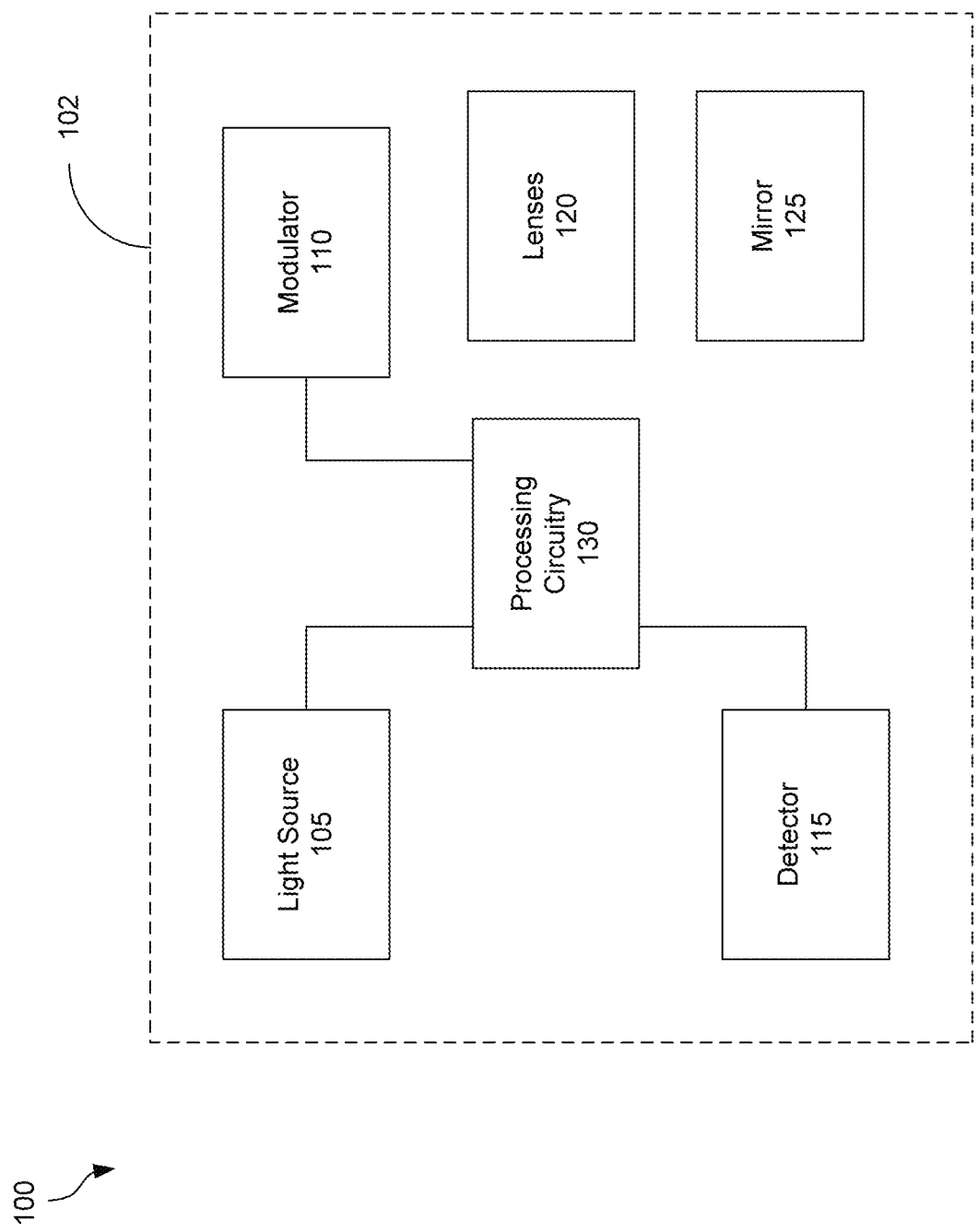
FIG. 1 illustrates an exemplary block diagram of a scattering processing system according to one or more aspects of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

Referring now to the drawings, wherein like reference numerals designate identical or corresponding parts throughout the several views:

The following describes lighting and/or imaging systems and associated methods with adaptive illumination and visualization enhancements. As an example, much of the following disclosure describes lighting systems and associated methods in the context of vehicle headlamp systems and associated methods for use with a vehicle (e.g., a car, truck, boat, plane, etc.). Although the following disclosure describes vehicle headlamp systems and associated methods for illuminating a roadway and/or a surrounding environment in a variety of driving conditions, other applications and other embodiments in addition to those described herein are within the scope of the present technology. For example, a person of ordinary skill in the art will readily recognize that at least some embodiments of the present technology may be useful for vehicle rear lamps, light detection and ranging (Lidar) systems, traffic lights, streetlights, lighthouses, and road signs, among other applications. As described in greater detail below, methods and/or systems configured in accordance with embodiments of the present technology are configured to use illumination reflected and/or backscattered to the lighting and/or imaging systems to generate an image of a target object in or through the fog.

When certain atmospheric conditions (e.g., fog, rain, snow, dust, pollution, and/or other scattering media) are present, illumination projected in a first direction is scattered in several directions, including in a second direction generally opposite to the first direction, to create backscattered noise. This scattering reduces (i) the amount of projected illumination that reaches an object and (ii) the amount of illumination that reflects off the object and returns to a detector of a lighting and/or imaging system. As such, the intensity of the reflected signal and its signal to noise ratio in the presence of the backscattered noise and/or another signal (e.g., glare) is greatly diminished, which results in poor brightness and contrast of the object through the atmospheric conditions and/or within a captured image. In addition, the nonuniform, heavy scattering distorts both the projected illumination on its way to the object and the reflected illumination on its way back to a detector of the lighting and/or imaging system. This results in poor resolution of the object through the atmospheric conditions and/or within a captured image.

Using conventional vehicle headlamp systems as an example, neither the low nor high beam settings provide adequate forward and/or lateral illumination when heavy fog, rain, snow, dust, and/or pollution are present because illumination projected from the conventional headlamps is scattered in several directions, including toward the driver's eyes. The scattering results in poor visibility of the roadway and/or of the surrounding environment as less illumination reaches the roadway and the driver's eyes are flushed by backscattered light from the fog, rain, snow, dust, pollution, and/or other driving conditions. In addition, these driving conditions distort illumination returning to the driver's eyes after it is reflected from the roadway and/or from objects in the surrounding environment.

To address this concern, many vehicles also include fog lights. Fog lights are typically positioned low on vehicles and specifically configured to provide a flat and wide distribution of illumination to minimize scattering toward the driver's eyes in the driving conditions described above. The distribution of illumination, however, cannot be adjusted, and portions of the illumination are directed toward the eyes of other road users. For this reason, it is illegal in many jurisdictions to use fog lights outside of extremely foggy driving conditions. Furthermore, fog lights are typically provided as a separate illumination source and are often used in lieu of, or in addition to, the vehicle's conventional headlamps.

FIG. 1 illustrates an exemplary block diagram of a scattering processing system 100 (herein referred to as the system 100) according to one or more aspects of the disclosed subject matter. As will be discussed in more detail later, one or more methods according to various embodiments of the disclosed subject matter can be implemented using the system 100 or portions thereof. Put another way, system 100, or portions thereof, can perform the functions or operations described herein regarding the various methods or portions thereof (including those implemented using a non-transitory computer-readable medium storing a program that, when executed, configures or causes a computer to perform or cause performance of the described method(s) or portions thereof).

The system 100 can include a light source 105, a modulator 110, a detector 115, and processing circuitry 130 (which can include internal and/or external memory). In one or more aspects of the disclosed subject matter, the light source 105, the modulator 110, the detector 115, and the processing circuitry 130 can be implemented in an apparatus 102. The apparatus 102 can represent various apparatuses that perform imaging through a scattering medium. For example, the apparatus 102 can be an autonomous vehicle where the headlights can adapt to fog (and/or other scattering media) using the scattering processing system 100. Alternatively, or additionally, the apparatus 102 can be a headlight of a vehicle where the components of the system 100 can be contained in and/or connected to the headlamp.

As a result, the vehicle (or vehicle with autonomous capabilities) can more clearly image the road ahead in and through the fog, thus improving the visibility for a driver and/or autonomous driving capability in the scattering medium. Further, the aforementioned components can be electrically connected or in electrical or electronic communication with each other as diagrammatically represented by FIG. 1, for example.

The light source 105 can represent one or more light sources in the system 100. For example, the light source 105 can be the light emitting portion of the headlamp of a vehicle.

The modulator 110 can represent one or more modulators in the system 100. The modulator 110 can be a spatial light modulator (SLM). For example, the modulator 110 can be a Digital Micromirror Device (DMD) which can include a plurality of micromirrors arranged in a matrix.

The detector 115 can represent one or more detectors in the system 100. In one or more aspects of the disclosed subject matter, the detector 115 can be an imaging device. For example, the imaging device can be a charge-coupled device (CCD) employing lock-in detection. Although other types of detectors can be contemplated, imaging device, detector, lock-in detector, CMOS image sensor, photodiode array, avalanche photodiode array and CCD can be used interchangeably herein. The detector 115 can be used to capture images of a target in or through the fog. In the example of a driving and/or autonomous driving scenario, the target can correspond to a road sign (e.g., stop sign), lane lines, a vehicle, and the like that may benefit from improved visualization through a scattering medium like fog. In one embodiment, if the apparatus 102 is an autonomous vehicle, the detector 115 can represent one or more imaging devices used for autonomous operation of the vehicle. The same process can also be used in a vehicle that has partial, limited, or no autonomous capability where the information captured by the detector 115 can be used to identify the environment surrounding the vehicle and assist the driver using a display, alerts, and the like, for example. Accordingly, the system 100 can use the imaging device to improve operation in various scattering media.

The processing circuitry 130 can carry out instructions to perform or cause performance of various functions, operations, steps, or processes of the system 100. In other words, the processor/processing circuitry 130 can be configured to receive output from and transmit instructions to the one or more other components in the system 100 to operate the system 100 to improve visualization through various scattering media.

The lenses 120 can represent one or more lenses in the system 100. For example, the system 100 can include a collimation lens, an imaging lens, a lens positioned in line with output from the modulator, and the like.

The mirror 125 can represent one or more mirrors in the system 100. For example, the mirror 125 can be used to direct light as needed within the system 100. In one example, the mirror 125 can direct collimated light from the light source 105 to the modulator 110.

Generally, the system 100 can be configured to achieve a high-quality image of a target object in and/or through the fog by eliminating or suppressing backscattered glare from the fog (or similar conditions) and revealing a target occluded by the fog by modulating the incident light both spatially and temporally. This takes advantage of the dynamic scattering properties of the fog, spatial light modulation to form concentrated illumination and diffusive illumination on the target, and lock-in detection to eliminate or reject the backscattered light. Here, lock-in detection can refer to using a lock-in detection device as a sensor, but also can refer to detecting the signal from the target following the modulation (oscillation) frequency of the temporal exchanges of the DMD patterns.

More specifically, the system 100 can be configured to increase the signal to noise ratio with localized illuminations while generating illumination series in time to oscillate the signal from the target object, thereby distinguishing the backscattered light from the fog which is not oscillating. In this way, the signal from the target can be set as alternating current (AC) while light from the fog can be set as direct current (DC) information which can be suppressed or eliminated by lock-in detection.

In other words, the localized illumination resulting from the spatial modulation via the modulator 110 shines more light on the target, which leads to more light being reflected from the target with a higher signal to noise ratio. At the same time, the diffusive illumination resulting from the random spatial modulation won't form the localized illumination. Instead, the diffusive illumination will randomly distribute illumination on the target. The speckle illumination pattern can also randomly change due to the movement of the particles in the fog.

The temporal exchange of the spatially modulated light to repeat the localized (or concentrated) and diffusive illumination can generate the periodically modulated illumination of the target point and the same response in the detection. The frequencies of the illumination patterns can be fixed as periodic patterns or changes in the different time manners, which would require related detection strategies for lock-in detection.

The spatial modulation can be determined by evaluating the system without the scattering medium. The evaluation can use various approaches including evaluating the transmission matrix. Other optimization algorithms can also be used including a genetic algorithm, partition algorithm, or gradual search methods, for example, to form localized illuminations on the targets. Further, the light can be spatially modulated to form a localized illumination and diffusive illumination on the targets with the same incident optical powers from the modulator. Alternatively, the spatial modulations for the diffusive illumination can have different output optical powers.

Figure 2:
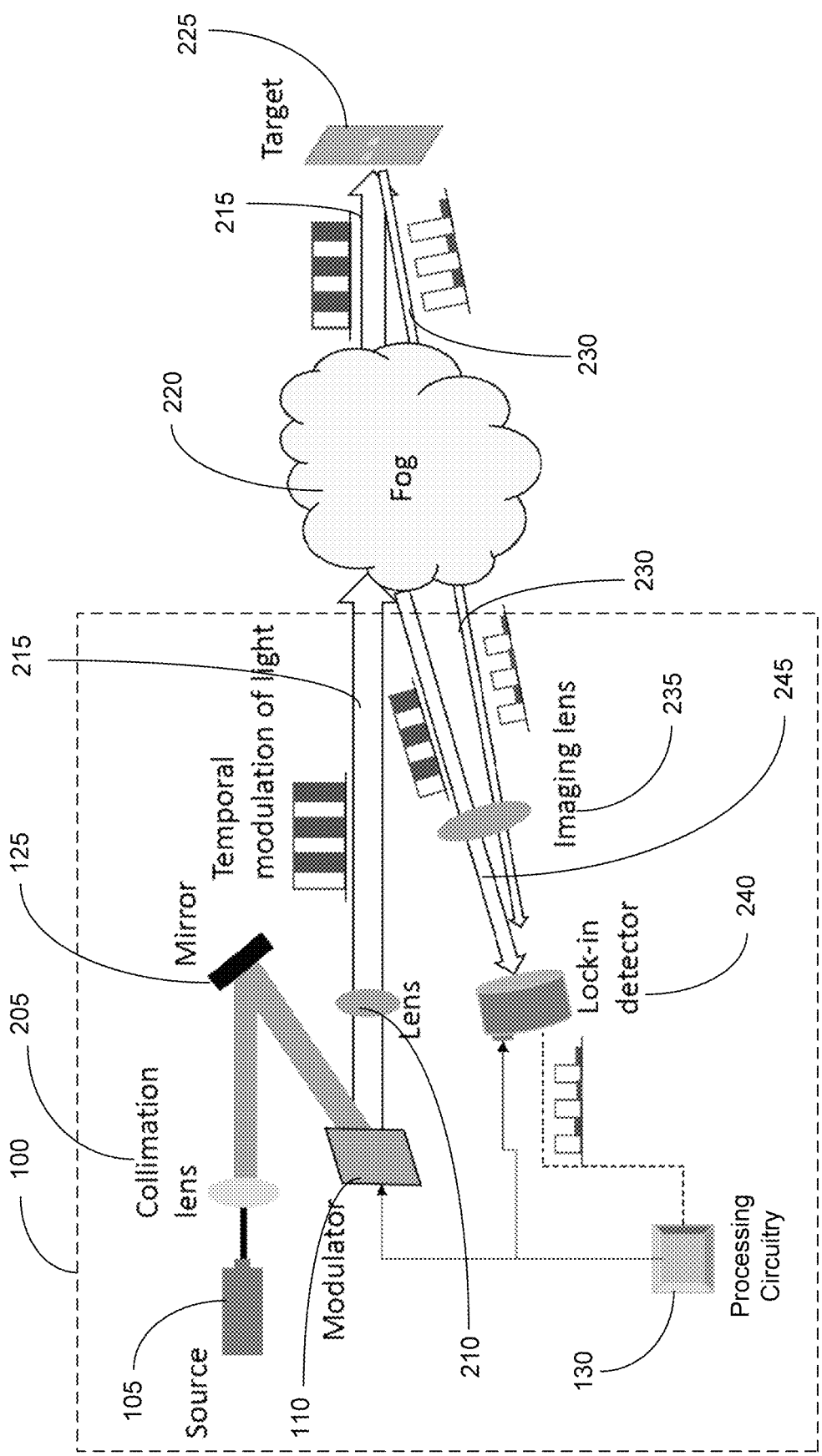
FIG. 2 illustrates an exemplary schematic diagram of a scattering processing system in an exemplary implementation according to one or more aspects of the disclosed subject matter.

FIG. 2 illustrates an exemplary schematic diagram of the system 100 in an exemplary implementation according to one or more aspects of the disclosed subject matter. In one embodiment, the system 100 can include the light source 105 positioned in line with a collimation lens 205 and a mirror (e.g., the mirror 125). The collimation lens 205 can collimate the light from the light source 105 and the collimated light reflects off the mirror 125 to a modulator (e.g., the modulator 110). The modulator 110 can be a digital micromirror device (DMD), for example. The modulator 110 can modulate the light (e.g., modulated light 215) based on input from the processing circuitry 130, for example. In other words, the modulated light 215 can be incident on a scattering system, and the modulated light 215 can include temporal variation. The temporal variation of the incident light can include spatial modulated distributions in a time sequence of spatially modulated light forming localized illumination and diffusive illumination on the target as further described herein.

The modulated light 215 can travel through a lens 210 before entering a scattering medium (e.g., fog 220). A portion of the modulated light 215 is backscattered (e.g., backscattered light 245) back toward the system 100 and a portion of the modulated light 215 travels into and/or through the fog 220 to a target 225. The modulated light backscattered from the fog 220 can travel through an imaging lens 235 and be received by a lock-in detector 240 (e.g., lock-in detector 240 can correspond to the detector 115 in FIG. 1). The light reflected from the target (e.g., reflected light 230) travels back through the fog 220, through an imaging lens 235, and is received by the lock in detector 240. The lock-in detector 240 can also be in communication with the processing circuitry 130. For example, the lock-in detector 240 can output information corresponding to the backscattered light and reflected light from the target to the processing circuitry 130. Additionally, the lock-in detector 240 can receive instructions from the processing circuitry 130. The spatial modulations corresponding to the localized and diffusive illuminations can be set to have the same incident optical power into the scattering system (e.g., fog and targets in and/or through the fog). As a result, the backscattered light from the fog would be the same for both the localized and diffusive illuminations. It should be appreciated that the collimation lens 205, lens 210, and imaging lens 235 can correspond to the one or more lens represented by the lenses 120 in FIG. 1.

The spatial modulation patterns can be generated in a time sequence incident into the scattering system (e.g., fog and targets in and/or through the fog). For example, the processing circuitry 130 can instruct the modulator 110 to generate the spatial modulation patterns in a time sequence. The light signal from the target points can be modulated in time while the backscattered light from the fog would not follow the time modulation. As a result, lock-in detection techniques can be used to distinguish between the light from the target and the backscattered light from the fog by detecting and amplifying the signal from the target while the backscattered light can be eliminated.

Figure 3:
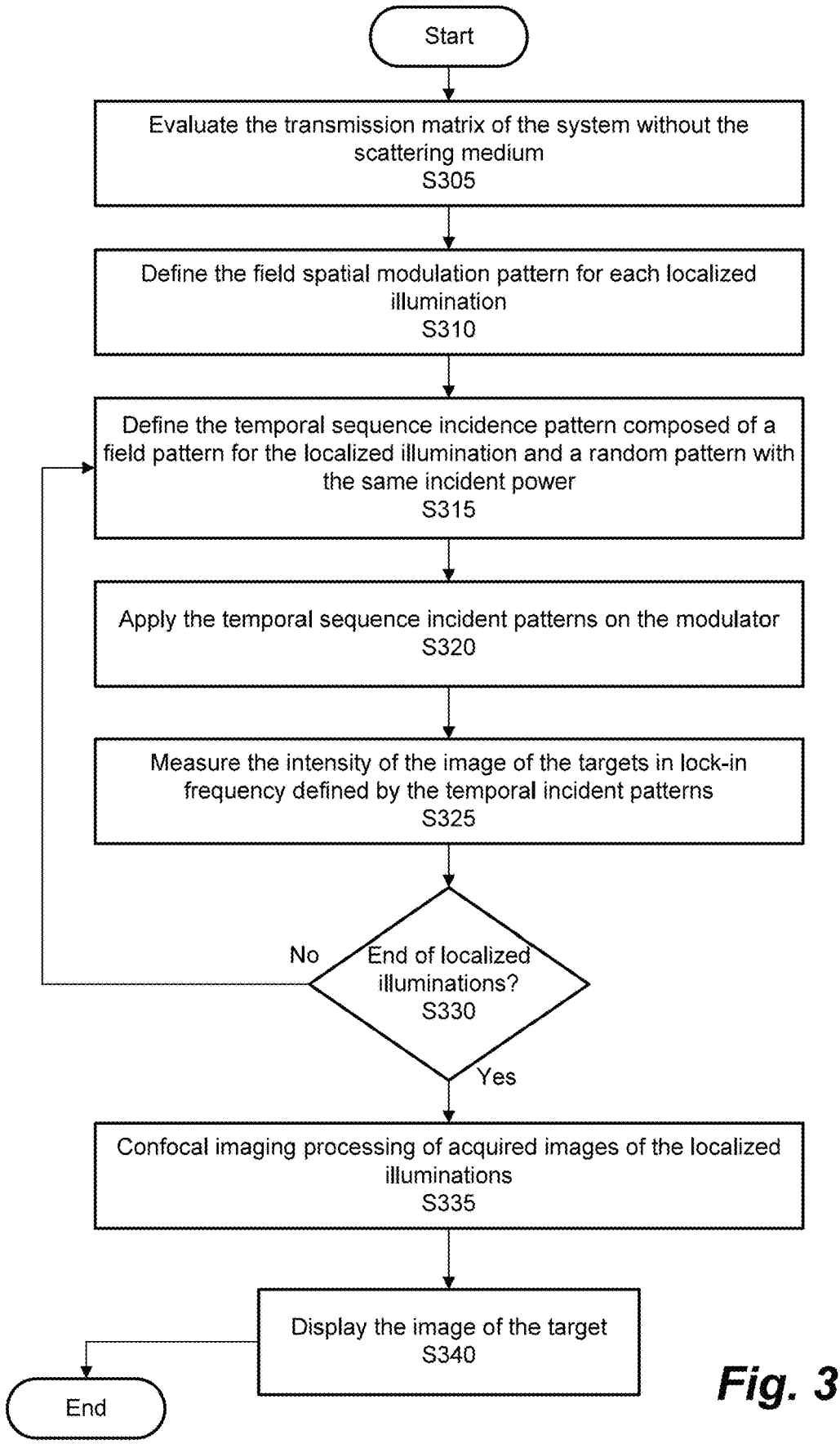
FIG. 3 is an algorithmic flow chart of a method for imaging a target in a scattering medium according to one or more aspects of the disclosed subject matter.

FIG. 3 is an algorithmic flow chart of a method for imaging a target in and/or through a scattering medium according to one or more aspects of the disclosed subject matter.

In S305, the system 100 can be configured to evaluate the transmission matrix of the system 100 without the scattering medium. By sending a series of incident patterns from the modulator 110 via the processing circuitry 130, while detecting the corresponded intensity distribution on the detector, by solving the equations, correlating the input patterns on the modulator and the corresponded output on the detector, the transmission matrix of the system can be evaluated with no scattering medium present. Although other scattering mediums can be contemplated, the scattering medium for the following description will be fog. In other words, the transmission matrix of the system can be evaluated without fog.

In S310, the system 100 can be configured to define the field spatial modulation pattern for each localized illumination based on the transmission matrix evaluated in S305.

In S315, the system 100 can be configured to define the temporal sequence incidence pattern composed of a field pattern for the localized illumination and a random pattern with the same incident power. In other words, for each localized illumination, a time sequence composed of the spatial modulation for the localized illumination and spatial modulation for the diffusive illumination is established.

In S320, the system 100 can be configured to apply the temporal sequence incident patterns defined in S315 on the modulator 110 with fog present. Additionally, the pattern for the localized illumination and the random pattern can be applied alternately.

In S325, the system 100 can be configured to measure the intensity of the image of the targets in lock-in frequency defined by the temporal incident patterns applied to the modulator in S320. In other words, the lock-in detection is applied to capture the information from the localized illumination while rejecting the backscattered light from fog.

In S330, the system 100 can be configured to determine whether there are any more localized illuminations to measure. If it is determined that there are more localized illuminations needed to be scanning on the object target, the process can return to S315 to define the temporal sequence incidence pattern composed of another field pattern for the localized illumination and a random pattern with the same incident power for this area on the object target. In other words, the length of the time sequence is determined by the lock-in detected signal, which can be amplified by the detection system. Then for the next localization illumination (i.e., the next point on the target), S315-S325 are repeated until all the selected points are illuminated locally and detected by the time sequence lock-in detection. However, if it is determined that there are no more localized illuminations, the process can continue to confocal image processing in S335.

In S335, the system 100 can be configured to perform confocal image processing of acquired images of the localized illuminations. In other words, the images of all the locally illuminated points are processed based on confocal image processing to acquire a bright, high contrasted image of the target.

In S340, the system 100 can be configured to display the image of the target. For example, displaying the image of the target can allow a driver to more clearly see the target through the fog and operate the vehicle accordingly. In one aspect, the image can be acquired using the confocal image processing in S335. The image can be displayed for the driver of a display, for example. Alternatively, or additionally, the image can be used by the system 100 to automatically determine information about the target which can be used for operation of the vehicle (e.g., if the target is determined to be a stop sign, a vehicle with at least some autonomous functionality may be instructed to stop). In one aspect, it may not be necessary to display the image for the vehicle operator's benefit because just the data of the image can be utilized by the autonomous system to judge and control the vehicle operation, for example. It should be appreciated that other similar situations can be contemplated including identifying road signs, lane lines, other vehicles, and the like in and through the fog and adjusting operation of the vehicle (e.g., an autonomous capable vehicle) accordingly. After the image of the target is displayed, the process can end.

Figure 4A:
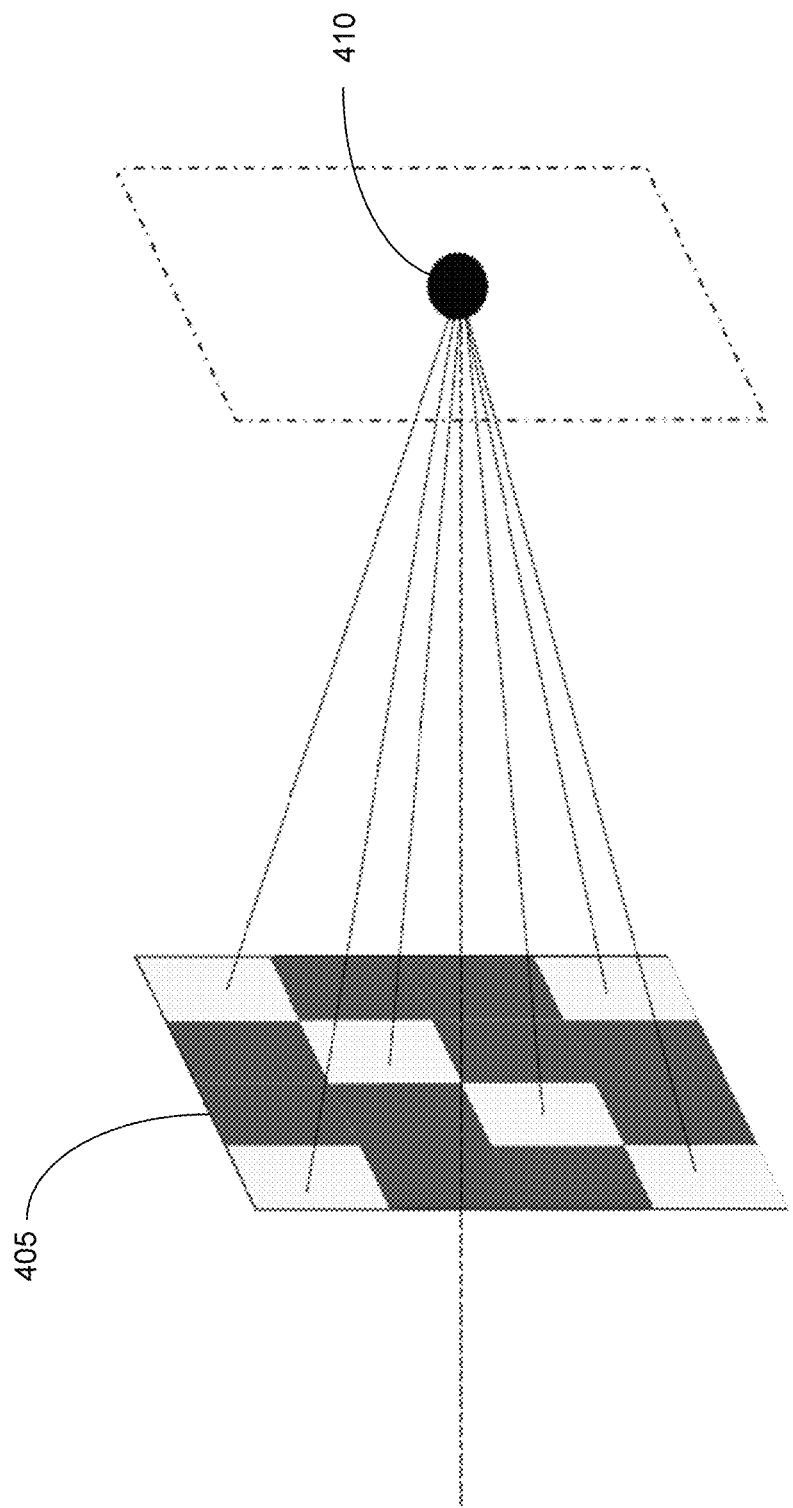
FIG. 4A illustrates an exemplary spatial modulation pattern to form a localized illumination according to one or more aspects of the disclosed subject matter.
Figure 4B:
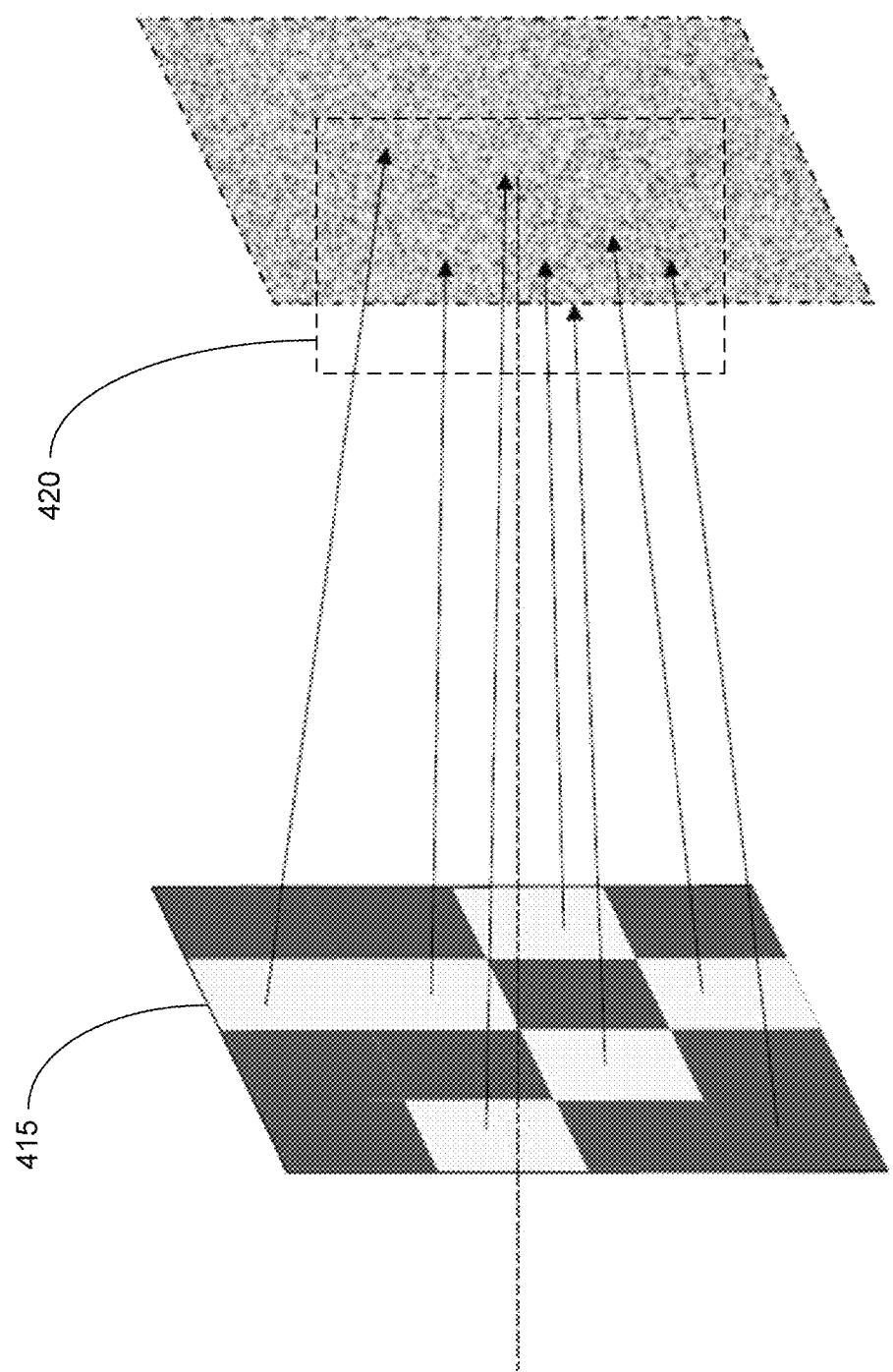
FIG. 4B illustrates an exemplary spatial modulation pattern with the same incident power as the spatial modulation pattern in FIG. 4A to form random speckle according to one or more aspects of the disclosed subject matter.

FIGS. 4A and 4B illustrate spatial modulation patterns with the same incident power. FIG. 4A illustrates an exemplary spatial modulation pattern 405 to form a localized illumination 410 according to one or more aspects of the disclosed subject matter. FIG. 4B illustrates an exemplary spatial modulation pattern 415 with the same incident power as the spatial modulation pattern in FIG. 4A to form random speckles 420 according to one or more aspects of the disclosed subject matter. First, as has been described herein regarding S305 of FIG. 3, the system 100 can be configured to evaluate the transmission matrix without fog. In calculating the transmission matrix, the spatial modulation patterns to form localized illumination points on the target can be acquired. In other words, the spatial distribution of the incident light can be defined regarding its field, either optical phase or the amplitude, to generate the localized illumination at the defined place on the target as shown in FIG. 4A. Next, the spatial distribution having the diffusive illumination on the target can be determined as show in FIG. 4B. For example, the speckle pattern can be the determined spatial distribution. Additionally, the spatial distribution for the speckle pattern can have the same optical power incident into the fog as the localized illuminations.

As the amplitude modulation configuration, a spatial modulation evaluated with the transmission matrix can form a localized illumination on the target, while a spatial modulation with the same number of the elements set 'ON' can form speckles statistically evenly distributed illumination on the target. Therefore, the points on the target will have a dramatically different power difference with these two spatial modulation patterns incident on the system. On the detection side, the detector will see the same effect because of the conjugation relation of the target and the detector. The target is imaged on the detector (e.g., a charge-coupled device (CCD)) by an optical image system. For the above two cases in FIG. 4A and FIG. 4B, the light backscattered from the fog can correspond to roughly the same power on the detector as shown in FIG. 5 and FIG. 6.

Figure 5:
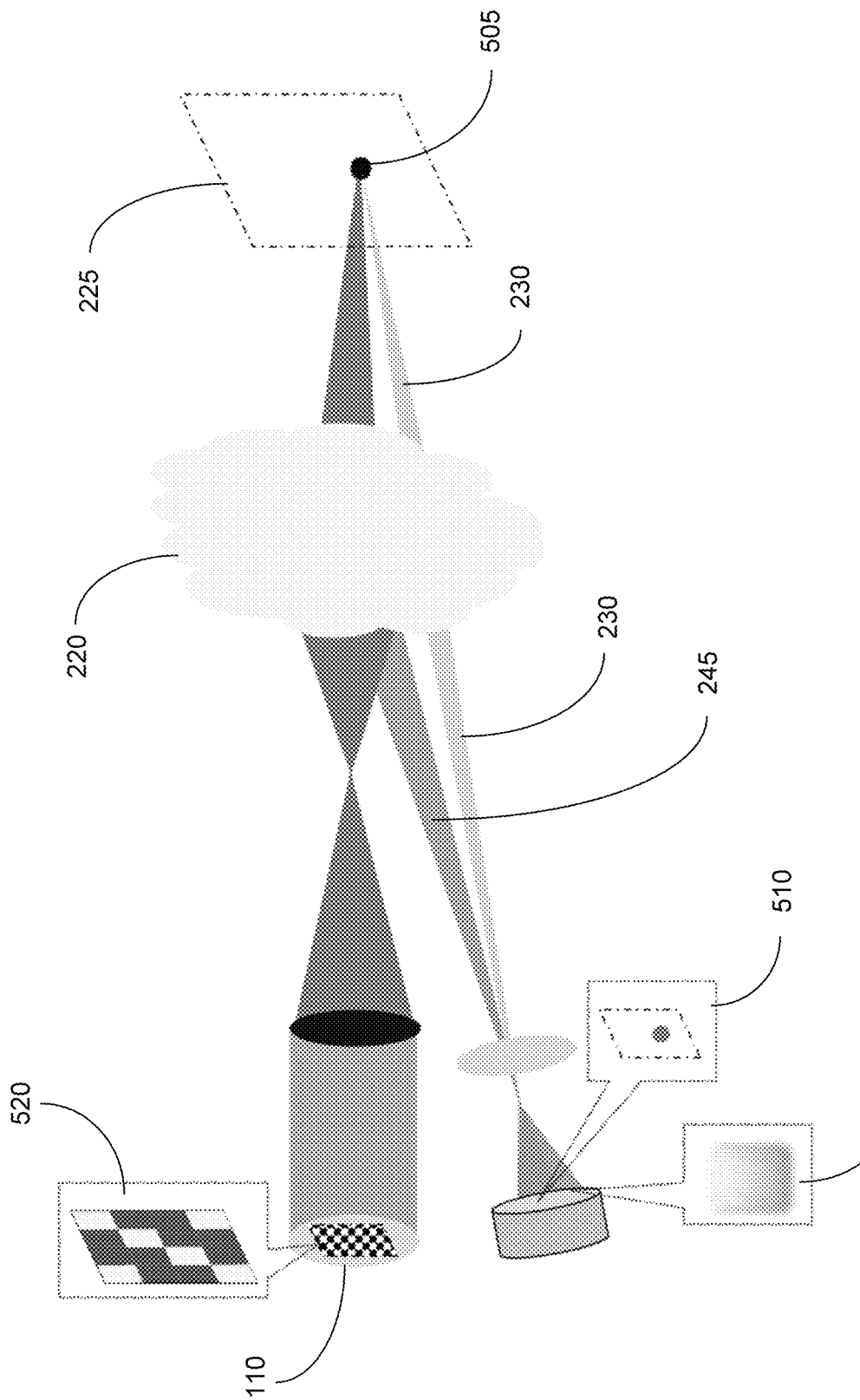
FIG. 5 illustrates an exemplary schematic diagram of a detection comparison between the reflection from the target and the backscattered light from the fog with the localized illumination according to one or more aspects of the disclosed subject matter.
Figure 6:
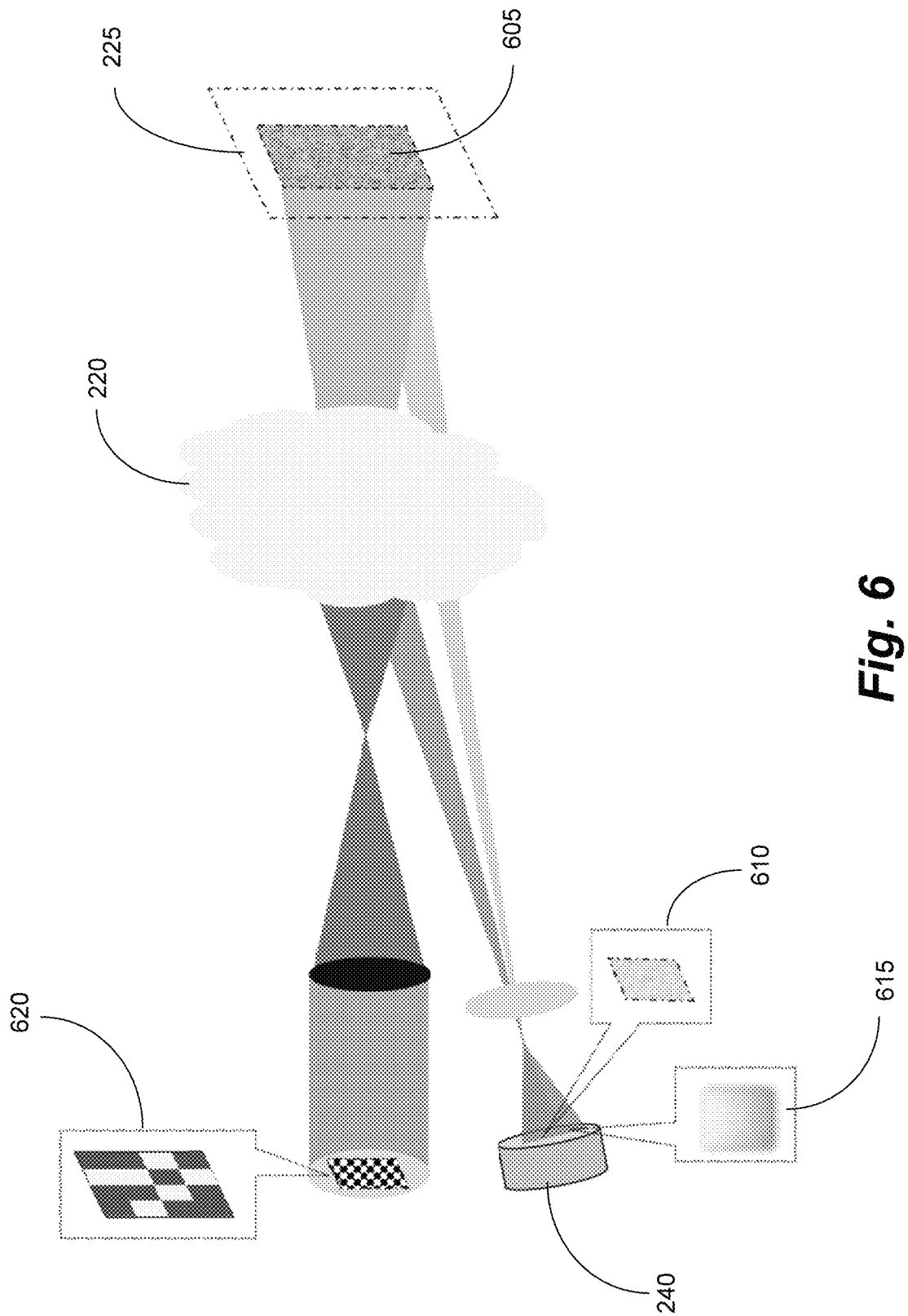
FIG. 6 is an exemplary schematic diagram of a detection comparison between the reflection from the target and the backscattered light from the fog with the diffusive illumination according to one or more aspects of the disclosed subject matter.

FIG. 5 and FIG. 6 illustrate an exemplary schematic diagram of a detection comparison between the reflection from the target 225 and the backscattered light from the fog 220. More specifically, FIG. 5 illustrates an exemplary schematic diagram of a detection comparison between the reflection from the target 225 and the backscattered light from the fog 220 with the localized illumination 505 according to one or more aspects of the disclosed subject matter. FIG. 6 is an exemplary schematic diagram of a detection comparison between the reflection from the target 225 and the backscattered light from the fog 220 with the diffusive illumination 605 according to one or more aspects of the disclosed subject matter.

As shown in FIG. 5, the spatial modulation (via the modulator 110) of the optical incidence on the scattering system (e.g., fog 220 and the target 225) generates the localized illumination 505 on the target 225 using a modulation pattern 520. The light (e.g., reflected light 230) reflected from the target 225 forms the image of illuminations 510 on a camera (e.g., lock-in detector 240) while the light (e.g., backscattered light 245) backscattered from the fog 220 forms glare 515 on the lock-in detector 240. When the incident modulation pattern switches to a diffusive modulation pattern 620 to generate a diffusive speckle pattern 605 on the target 225 as shown in FIG. 6, the image on the lock-in detector 240 gives a similar diffusive distribution 610. In other words, the light backscattered from the fog 225 generates the glare on the detector (e.g., the lock-in detector 240) which is statistically the same as the light received on the detector when the localized illumination is formed on the target 225 with the same incident illumination on the scattering system as show in FIG. 5. Accordingly, with the different spatial modulations of the localized illumination pattern 520 and the diffusive modulation pattern 620 incident onto the scattering system (e.g., the fog 220 and target 225), the signal reflecting the information from the target 225 shows variation for the different spatial modulations while the backscattered light from the fog does not show significant variation for the different spatial modulations.

By using lock-in detection to measure the spatial modulations for localized illumination (e.g., FIG. 5) and diffusive illumination (e.g., FIG. 6) in time sequence, the backscattered light (i.e., glare) from the fog, as the DC components, can be eliminated completely. The combination of the localized illumination with the spatial modulation of the incident light and the temporal (i.e., time-sequential) modulation not only increases the overall signal to noise ratio from the target 225 due to the localized illumination, but also suppresses the backscattered light from the fog by the lock-in detection.

Figure 7:
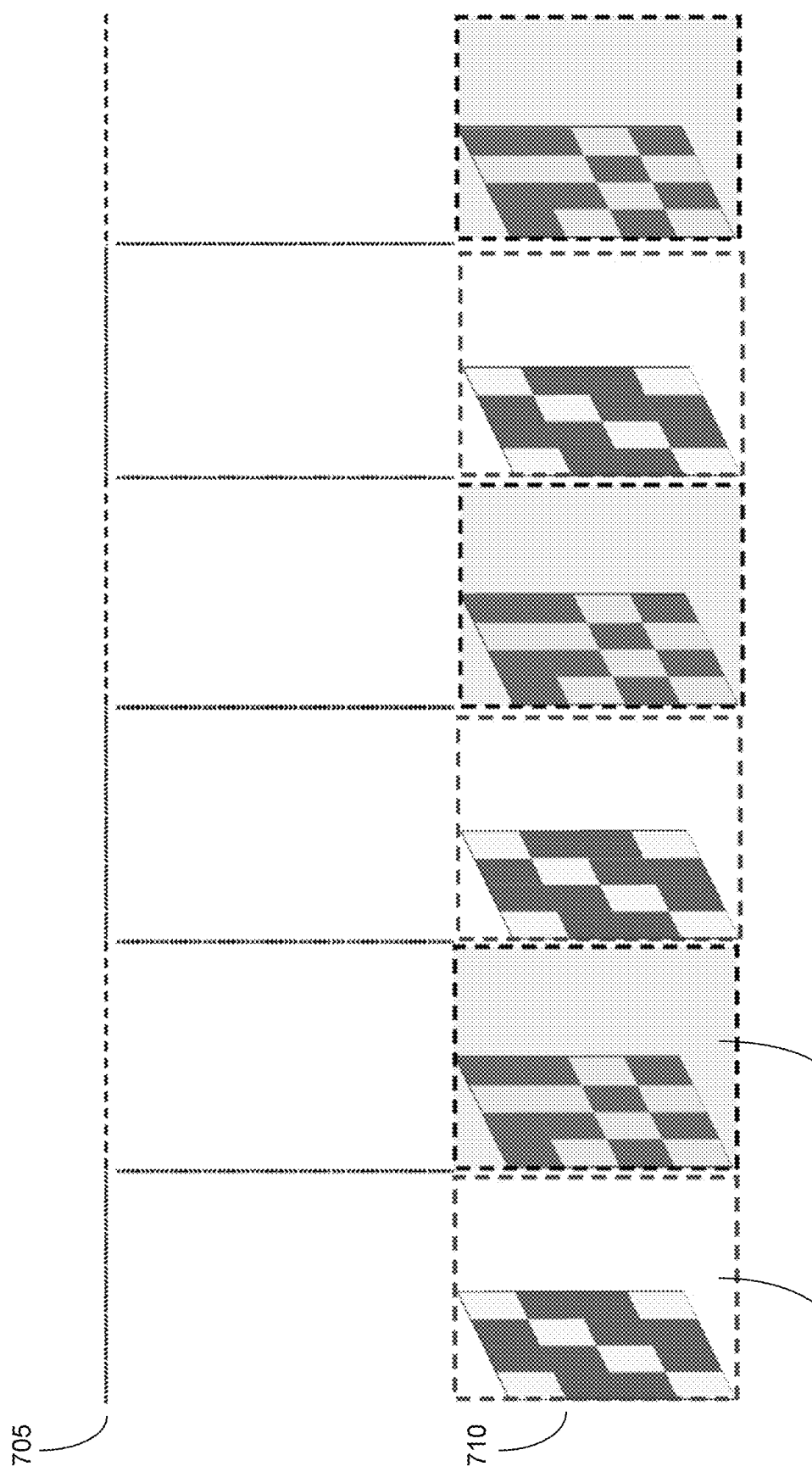
FIG. 7 illustrates incident spatial modulations in time sequence composed of spatial modulation patterns for localized illumination and spatial modulation for diffusive illumination on the target according to one or more aspects of the disclosed subject matter.

FIG. 7 illustrates incident spatial modulations in time sequence composed of spatial modulation patterns for localized illumination and spatial modulation for diffusive illumination on the target according to one or more aspects of the disclosed subject matter. As described in S315 in FIG. 3, the incident spatial modulations in time sequence composed of a spatial modulation pattern for localized illumination and a spatial modulation for diffusive illumination on the target is defined as shown in FIG. 7, in which each spatial modulation pattern puts the same incident power level onto the scattering system. FIG. 7 includes a graph of an optical incident power level 705 and incident spatial modulations in time sequence 710. For the incident spatial modulations in time sequence 710, a spatial modulation pattern 715 to form localized illumination. Next, the sequence includes a spatial modulation pattern 720 to form a random speckle pattern wherein the spatial modulation pattern 720 has the same incident power as the spatial modulation pattern 715. The spatial modulation patterns alternate accordingly as shown in FIG. 7. In this time sequence, the spatial pattern for the localized illumination can be kept the same, while the spatial modulation for the diffusive illuminations in the sequence can have the same optical incident power on the scattering system. It should be appreciated that although the spatial modulation patterns for the diffusive illuminations look the same in the in FIG. 7, they can be different as long as they have the same optical power. Alternatively, the spatial modulation for the diffusive illuminations in the sequence can have a 50% difference of the optical power. It should be appreciated that although the spatial modulation patterns for the diffusive illuminations look the same in the in FIG. 7, they can be different as long as they have the same optical power.

Figure 8:
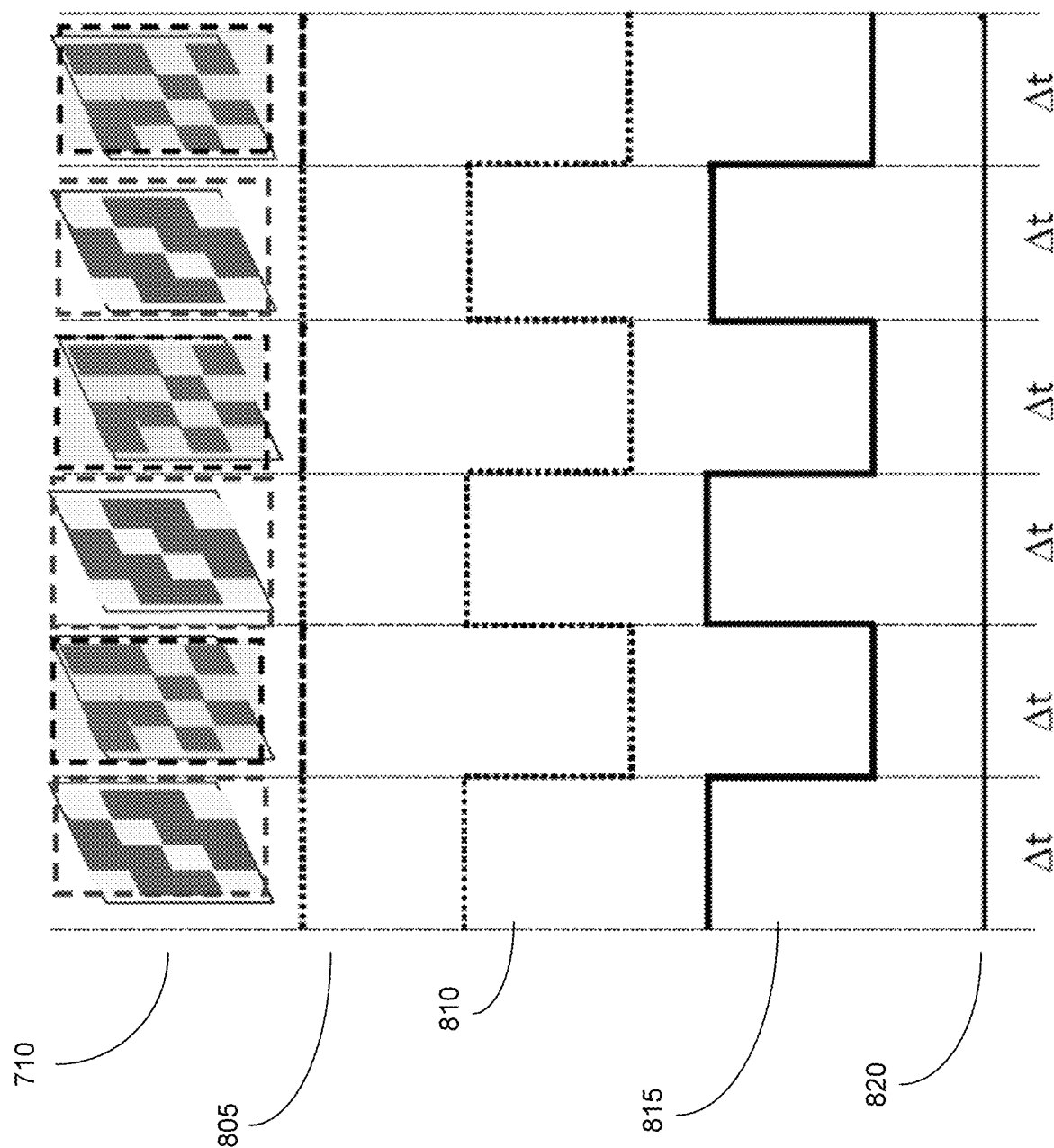
FIG. 8 illustrates an exemplary graph of a power level at different locations over time corresponding to the incident optical patterns in time sequence according to one or more aspects of the disclosed subject matter.

FIG. 8 illustrates an exemplary graph of a power level at different locations over time corresponding to the incident optical patterns in time sequence 710 according to one or more aspects of the disclosed subject matter. The optical power in the time sequence from the spatial modulations can correspond to the optical power levels shown in FIG. 7 and FIG. 8. FIG. 8 includes the incident optical patterns in time sequence 710 as shown in FIG. 7, incident optical power on fog (805), power on local target point (810), measured power of the target point on the detector (815), and measured power on the detector from the fog without the target (820). The optical power incidence on the target point behind the fog (810) does not have the same optical power over time. Instead, FIG. 7 shows that the optical power incident on the target point shows variation based on the spatial modulation pattern. For example, the optical power incident on the target (810) is higher for the localized illumination compared to the diffusive illuminations. On the detector (e.g., camera) located on the same side as the illumination source, the measured power on the detector of the image of the target point (815) at which the localized illumination takes place shows periodic response corresponding to the localized and diffusive illuminations. The light backscattered from fog (820) (taking out the target behind the fog to avoid any reflected light from the target into the detector) detected by the detector would show no sign of periodic response due to the same level of incident powers on the fog from the illuminations. Even though the incident power of the diffusive illumination does not have the same incident power as the one for the localized illuminations, the dynamic scattering characteristic of fog would give statistically randomized responses with no periodic traces, which could be completely distinguished from the periodic response from the target at the illuminations in the time sequence. Therefore, the backscattered light from the fog can be completely removed from the detected signal when the lock-in detection is employed. In other words, the detector can sense the periodic response from the illuminated target point. It should be noted that not only the periodic illuminations can be used. For example, other time modulations including linear changed time frequency, chirped frequency modulation, and the like can be also applied. Also, it should be noted that the modulation frequency can be varied in accordance with the specification of the modulator (e.g., digital micromirror device (DMD) or spatial light modulator (SLM)) and the detector (e.g., CCD), and/or the condition or the circumstance to avoid the ambient noise.

The detector signal with lock-in detection can be amplified with the preset amplification factor to increase the signal-to-noise ratio. Then the process is configured to continue all the localized illuminations before the confocal image processing is applied to all the imaged target points. The confocal image processing forms the overall image of the target as described in S335 in FIG. 3, followed by displaying the image (or utilizing the image data for autonomous operation) in S340 in FIG. 3.

Regarding generating the same incident power into the fog with different illumination patterns on targets, it should be appreciated that if using a liquid crystal based spatial light modulator, every incident pattern is of the same optical power. If using a digital micromirror device (DMD), which can reach 22 kHz (faster modulation frequency than a SLM of 60 Hz), with the same number of pixels switched to an "ON" position as the modulation pattern corresponding to pattern forming the localized illumination would generate the same incident optical power into the scattering system. Additionally, in one aspect, because of the dynamic scattering properties of fog, the incident power of the diffusive illuminations in DMD modulation configuration can be 50% higher or lower than the localized illumination.

Figure 9:
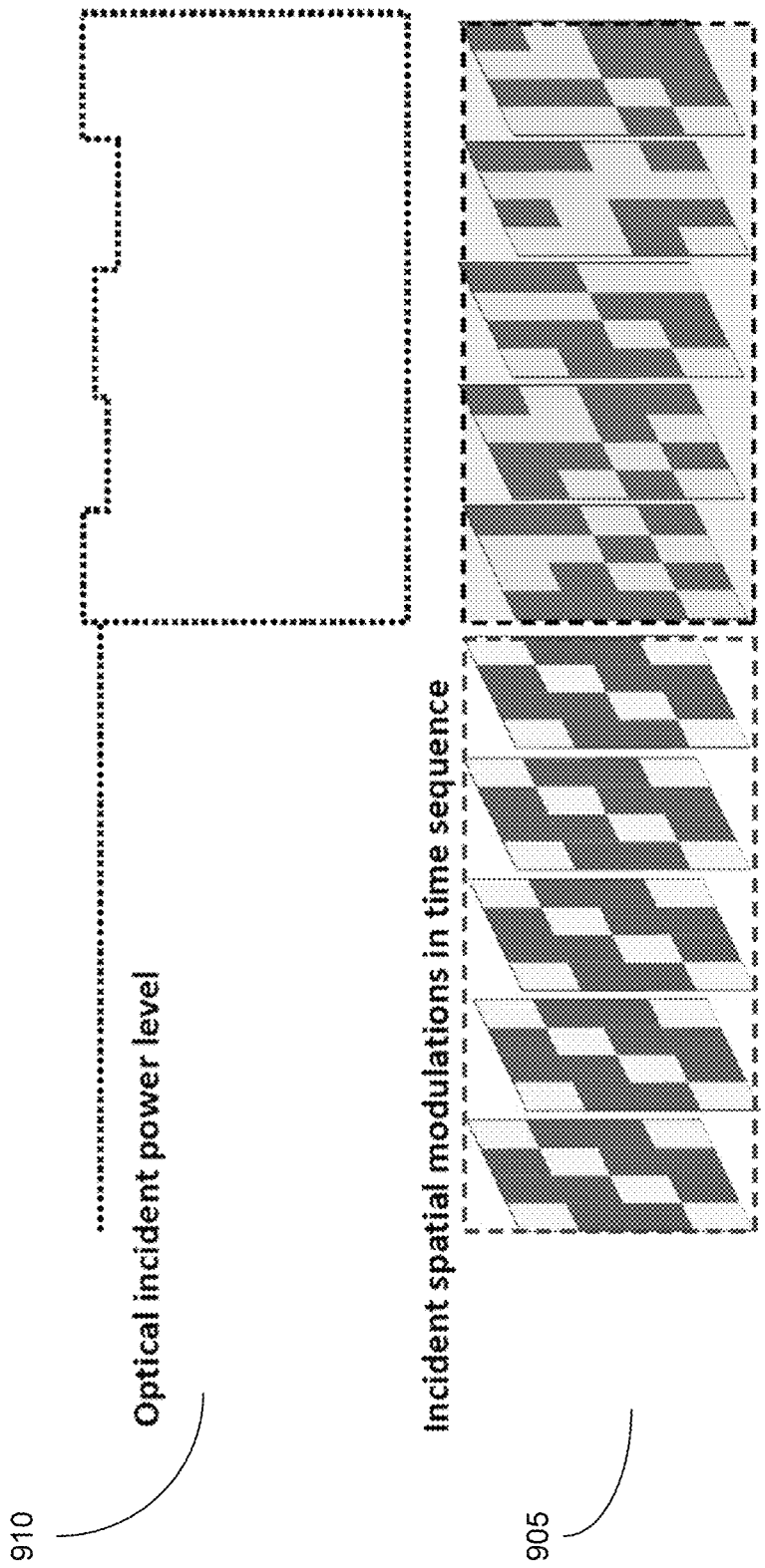
FIG. 9 illustrates an exemplary graph indicating that incident power of the diffusive illuminations can be within a predetermined amount higher or lower than the incident power of the localized illumination according to one or more aspects of the disclosed subject matter.

FIG. 9 illustrates an exemplary graph indicating that incident power of the diffusive illuminations can be within a predetermined amount higher or lower than the incident power of the localized illumination. FIG. 9 includes incident spatial modulations in time sequence 905 and corresponding optical incident power level 910. In the time sequence, the spatial modulation for the diffusive illumination 905 can be different modulations with a different level of incident power onto the scattering system while the modulation for the localized illumination can be the same number of the localized illumination. Alternatively, the modulation for the localized illumination can be one localized modulation with extended incident illumination time.

Figure 10:
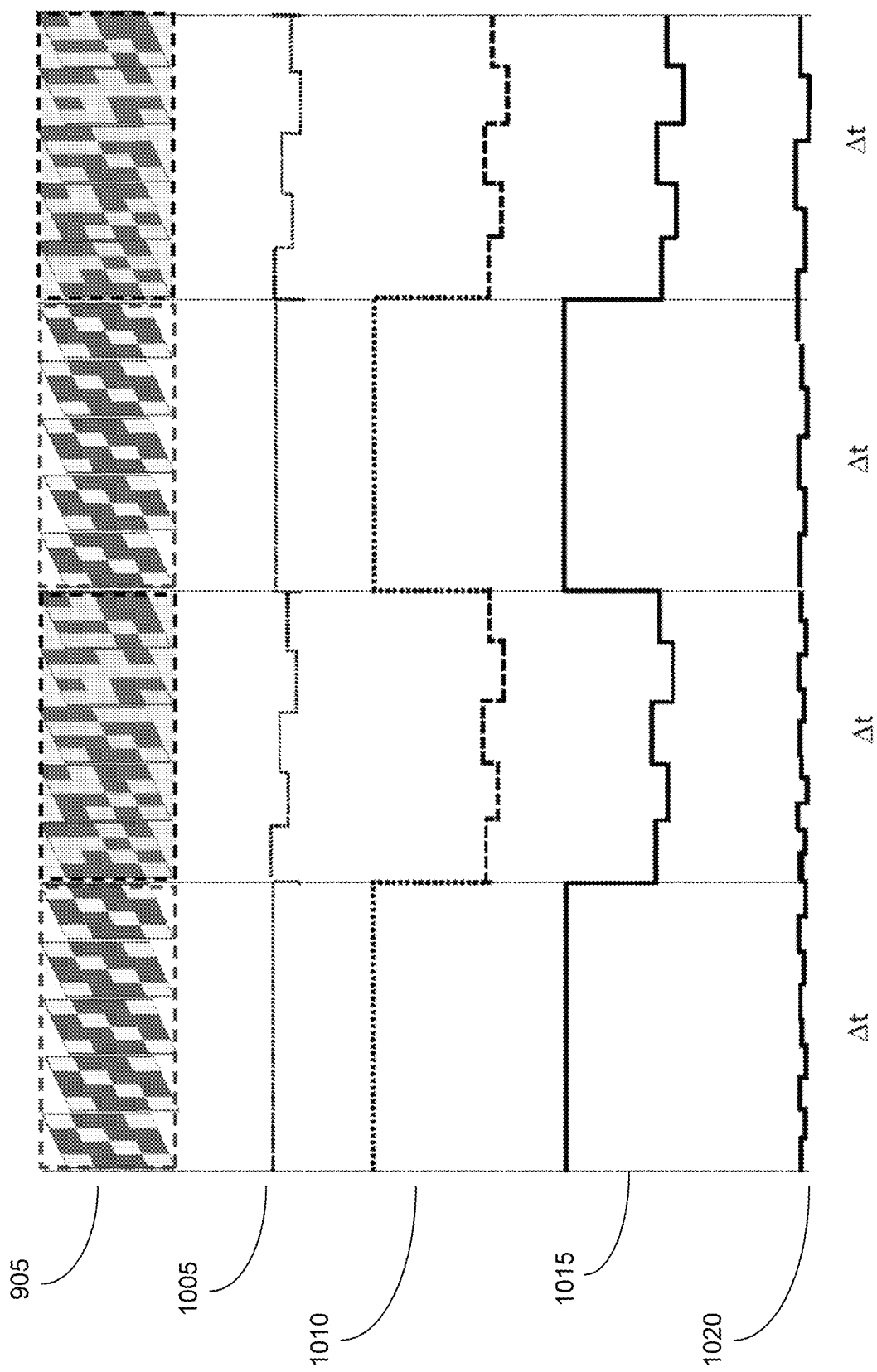
FIG. 10 illustrates an exemplary graph indicating a power level at different locations over time corresponding to the incident optical patterns in time sequence according to one or more aspects of the disclosed subject matter.

FIG. 10 illustrates an exemplary graph indicating a power level at different locations over time corresponding to the incident optical patterns in time sequence 905 according to one or more aspects of the disclosed subject matter. The optical power on the fog (1005) can be varied with the different modulations for the diffusive illuminations. However, the power incident on the target (1010) behind the fog can be periodic in terms of the time or modulations. The detection of the target point (1015) may not be the same power level because of the variation of the incident optical power of the diffusive illuminations, but the overall periodicity between the localized illuminations of the diffusive illuminations is maintained. The backscattered light from the fog (1020) would not show any periodicity due to the dynamic scattering characteristic of the fog. This means the lock-in detection via the lock-in detector 240 can also be employed here to eliminate the backscattered light from fog.

Figure 11:
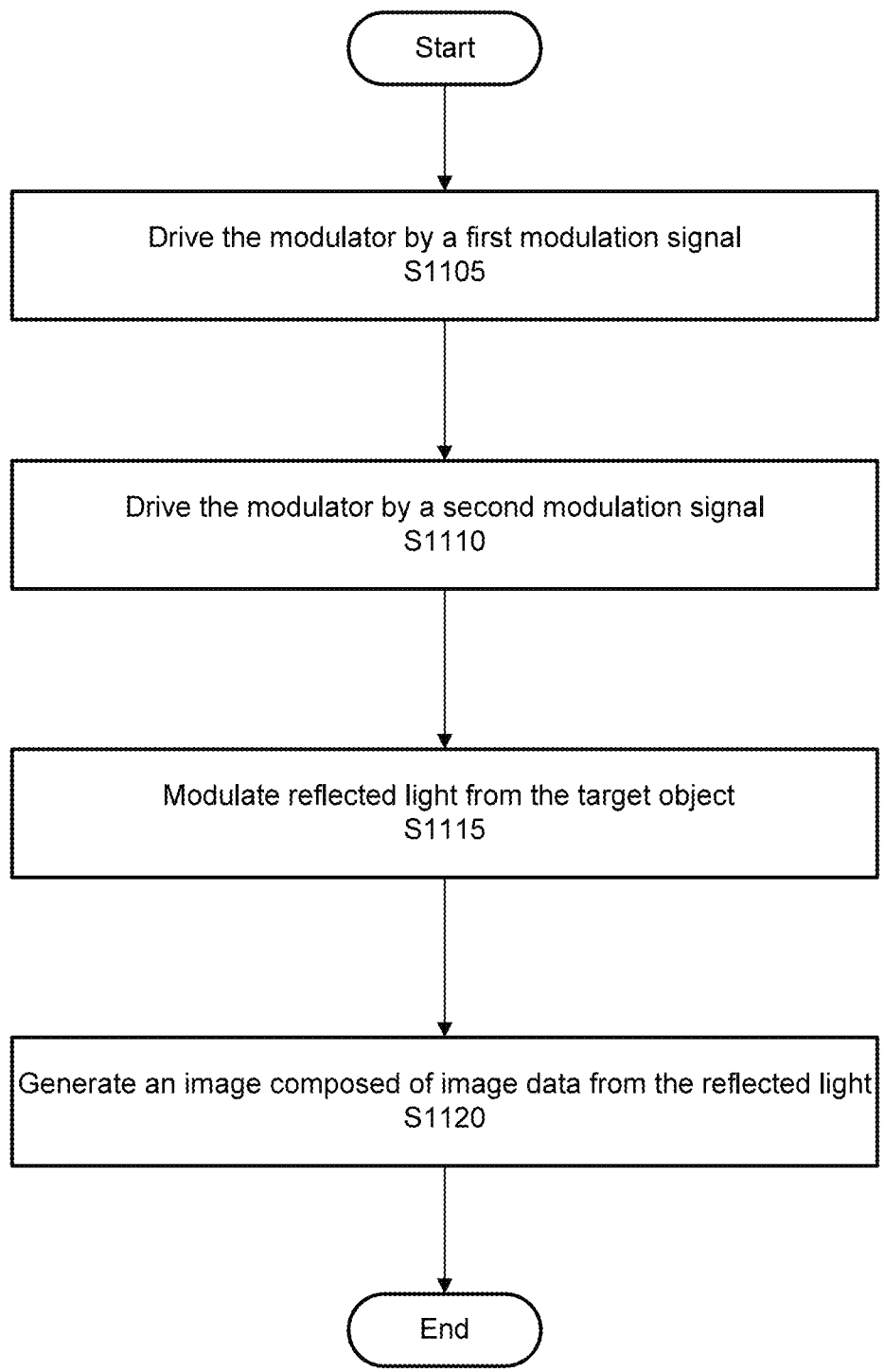
FIG. 11 is an algorithmic flow chart of a method for generating an image of a target object according to one or more aspects of the disclosed subject matter.

FIG. 11 is an algorithmic flow chart of a method for generating an image of a target object according to one or more aspects of the disclosed subject matter.

In S1105, the system 100 can be configured to drive the spatial light modulator (e.g., modulator 110) by a first modulation signal. The first modulation signal can be for irradiating a first pattern. The first pattern can correspond to generating a plurality of localized illuminations on the target object (e.g., target object 225).

In S1110, the system 100 can be configured to drive the spatial light modulator by a second modulation signal. The second modulation signal can be for irradiating a second pattern. The second pattern can correspond to a pattern or random reference light. For example, the second pattern can correspond to a random speckle pattern (e.g., see FIG. 4B). Further, the first pattern and the second pattern can be irradiated alternately. Additionally, the system 100 can be configured to drive the spatial light modulator (e.g., modulator 110) and/or the light source (e.g., light source 105) so that an intensity of the first pattern can be the same as an intensity of the second pattern. In other words, the first pattern and the second pattern can be irradiated in a temporal sequence incidence pattern, each pattern having the same intensity, which can assist in eliminating the backscattered light from the fog as has been described herein. Alternatively, the intensity of the first pattern and the intensity of the second pattern can be different. For example, the intensity of the second pattern can be random.

In S1115, the system 100 can be configured to modulate reflected light from the target object 225 in response to a received modulation signal (e.g., the first modulation signal). The reflected light can be detected at a lock-in detector (e.g., the lock-in detector 240) wherein the reflected light is generated by the first irradiation pattern for generating the plurality of localized illuminations. The lock-in detector can include a lock-in amplifier configured to receive an input of a sensing signal (e.g., the first modulation signal) from the lock-in detector, modulate the reflected light from the target object, and output the plurality of localized illuminations used for generating the image of the target object 225. Additionally, the backscattered light from the fog can be eliminated using the lock-in detection and alternating the spatial modulations between localized illumination and diffusive illumination in time sequence. Alternatively, the backscattered light from a scattering medium (e.g., fog) can be eliminated using a camera as a detector in combination with a Fast Fourier Transform (FFT) technique. For example, by applying the specific time sequence for each localized illumination on the target object, acquiring the series of data (images) corresponding to the sequence of the input images, then applying the Fourier Transform on the data, which reveals the frequency response of modulation of the time sequence, the intensity value at the frequency is the value for that localized illumination.

In S1120, the system 100 can be configured to generate an image of the target object 225 composed of image data from the reflected light. More specifically, the image of the target object is generated by composing the plurality of localized illuminations based on the reflected light from each of the plurality of localized illuminations. After generating the image of the target object, the process can end.

The system 100 includes several advantages including improving visualization in various weather conditions including fog, rain, snow, pollution, and the like. For example, lock-in detection can be employed to eliminate the backscattered light from the dynamic scattering medium (e.g., fog) based on the different responses from the overall backscattering of the fog and the directly reflected light from the target behind and/or in the fog. The dual modulation approach can also be employed in other fields for similar functionalities. For example, modulation of the spectral wavelength, polarization, intensity, frequency, etc. in the ultrasonic, millimeter wave fields, for example.

Additionally, in one embodiment, the system 100 can increase the signal-to-noise ratio in biological in-vivo imaging.

In the above description of FIG. 3 and FIG. 11, any processes, descriptions or blocks in flowcharts can be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The various elements, features, and processes described herein may be used independently of one another or may be combined in various ways. All possible combinations and sub-combinations are intended to fall within the scope of this disclosure.

Figure 12:
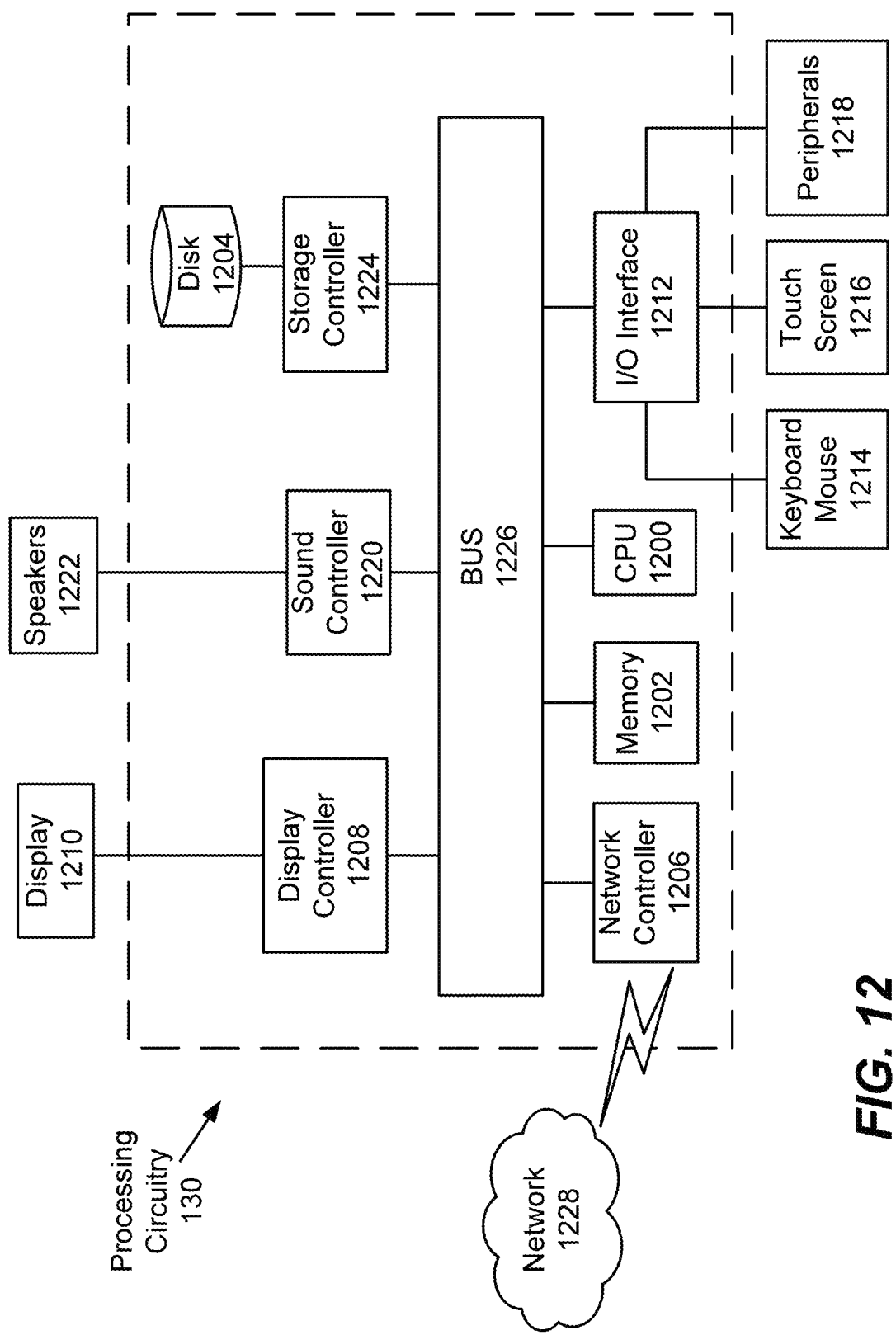
FIG. 12 is a hardware block diagram of a server according to one or more exemplary aspects of the disclosed subject matter.

Next, a hardware description of processing circuitry 130 according to exemplary embodiments is described with reference to FIG. 12. The hardware description described herein can also be a hardware description of the processing circuitry. In FIG. 12, the processing circuitry 130 includes a CPU 1200 which performs one or more of the processes described above/below. The process data and instructions may be stored in memory 1202. These processes and instructions may also be stored on a storage medium disk 1204 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the processing circuitry 130 communicates, such as a server or computer.

Further, the claimed advancements may be provided as a utility application, background daemon, or component of an operating system, or combination thereof, executing in conjunction with CPU 1200 and an operating system such as Microsoft Windows, UNIX, Solaris, LINUX, Apple MAC-OS and other systems known to those skilled in the art.

The hardware elements in order to achieve the processing circuitry 130 may be realized by various circuitry elements. Further, each of the functions of the above described embodiments may be implemented by circuitry, which includes one or more processing circuits. A processing circuit includes a particularly programmed processor, for example, processor (CPU) 1200, as shown in FIG. 12. A processing circuit also includes devices such as an application specific integrated circuit (ASIC) and conventional circuit components arranged to perform the recited functions.

In FIG. 12, the processing circuitry 130 includes a CPU 1200 which performs the processes described above. The processing circuitry 130 may be a general-purpose computer or a particular, special-purpose machine. In one embodiment, the processing circuitry 130 becomes a particular, special-purpose machine when the processor 1200 is programmed to perform backscattering elimination from fog via spatial and temporal modulations (and in particular, any of the processes discussed with reference to FIG. 3 and FIG. 11).

Alternatively, or additionally, the CPU 1200 may be implemented on an FPGA, ASIC, PLD or using discrete logic circuits, as one of ordinary skill in the art would recognize. Further, CPU 1200 may be implemented as multiple processors cooperatively working in parallel to perform the instructions of the inventive processes described above.

The processing circuitry 130 in FIG. 12 also includes a network controller 1206, such as an Intel Ethernet PRO network interface card from Intel Corporation of America, for interfacing with network 1228. As can be appreciated, the network 1228 can be a public network, such as the Internet, or a private network such as an LAN or WAN network, or any combination thereof and can also include PSTN or ISDN sub-networks. The network 1228 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The processing circuitry 130 further includes a display controller 1208, such as a graphics card or graphics adaptor for interfacing with display 1210, such as a monitor. A general purpose I/O interface 1212 interfaces with a keyboard and/or mouse 1214 as well as a touch screen panel 1216 on or separate from display 1210. General purpose I/O interface also connects to a variety of peripherals 1218 including printers and scanners.

A sound controller 1220 is also provided in the processing circuitry 130 to interface with speakers/microphone 1222 thereby providing sounds and/or music.

The general-purpose storage controller 1224 connects the storage medium disk 1204 with communication bus 1226, which may be an ISA, EISA, VESA, PCI, or similar, for interconnecting all of the components of the processing circuitry 130. A description of the general features and functionality of the display 1210, keyboard and/or mouse 1214, as well as the display controller 1208, storage controller 1224, network controller 1206, sound controller 1220, and general purpose I/O interface 1212 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. An image capture apparatus, comprising:
   a light source;
   a spatial light modulator including a plurality of micromirrors arranged in a matrix, the spatial light modulator modulating light irradiated from the light source to a target object;
   an imaging device configured to generate image data by capturing one or more images of the target object; and
   processing circuitry configured to
      drive the spatial light modulator by a first modulation signal, the first modulation signal being for irradiating a first pattern, wherein the first pattern corresponds to generating a plurality of localized illuminations on the target object,
      drive the spatial light modulator by a second modulation signal, the second signal being for irradiating a second pattern, wherein the first pattern and the second pattern are irradiated alternately and the second pattern is different from the first pattern,
      modulate reflected light from the target object, the reflected light from the target object being detected at a detector, and
      generate an image composed of image data from the reflected light of the plurality of localized illuminations,
      wherein the detector is a lock-in detector including a lock-in amplifier included in the lock-in detector, wherein the lock-in amplifier is configured to
         receive an input of a sensing signal from the lock-in detector,
         modulate reflected light of the target object based on the first modulation signal, and
         output the plurality of localized illuminations for generating the image of the target object.

2. The image capture apparatus of claim 1, wherein the second pattern does not generate localized illuminations on the target object.

3. The image capture apparatus of claim 2, wherein the second pattern is a random speckle pattern.

4. The image capture apparatus of claim 1, wherein a first intensity of the first pattern generating the plurality of localized illuminations is the same as a second intensity of the second pattern.

5. The image capture apparatus of claim 1, wherein a first intensity of the first pattern generating the plurality of localized illuminations is different than a second intensity of the second pattern, wherein the second intensity of the second pattern is random.

6. The image capture apparatus of claim 1, wherein the first pattern and the second pattern are applied in a temporal sequence incident pattern.

7. The image capture apparatus of claim 1, wherein the processing circuitry is further configured to
   eliminate backscattered light based on the first pattern and second pattern being irradiated alternately.

8. A method, comprising:
   driving, by processing circuitry, a modulator by a first modulation signal, the first modulation signal being for irradiating a first pattern, wherein the first pattern corresponds to generating a plurality of localized illuminations on the target object;
   driving, by the processing circuitry, the modulator by a second modulation signal, the second signal being for irradiating a second pattern, wherein the first pattern and the second pattern are irradiated alternately and the second pattern is different from the first pattern;
   modulating, by the processing circuitry, reflected light from a target object, the reflected light from the target object being detected at a detector;
   receiving an input of a sensing signal from the detector, wherein the detector is a lock-in detector;
   modulating reflected light of the target object based on the first modulation signal; and
   outputting the plurality of localized illuminations for generating the image of the target object;
   generating, by the processing circuitry, an image composed of image data from the reflected light of the plurality of localized illuminations.

9. The method of claim 8, wherein the second pattern does not generate localized illuminations on the target object.

10. The method of claim 9, wherein the second pattern is a random speckle pattern.

11. The method of claim 8, further comprising:
    driving the modulator so a first intensity of the first pattern generating the plurality of localized illuminations is the same as a second intensity of the second pattern.

12. The method of claim 8, further comprising:
    driving the modulator so a first intensity of the first pattern generating the plurality of localized illuminations is different than a second intensity of the second pattern, wherein the second intensity of the second pattern is random.

13. The method of claim 8, further comprising:
    applying the first pattern and the second pattern in a temporal sequence incident pattern.

14. The method of claim 8, further comprising:
    eliminating backscattered light based on the first pattern and second pattern being irradiated alternately.

15. A non-transitory computer-readable storage medium storing computer-readable instructions thereon which, when executed by a computer, cause the computer to perform a method, the method comprising:
    driving a modulator by a first modulation signal, the first modulation signal being for irradiating a first pattern, wherein the first pattern corresponds to generating a plurality of localized illuminations;

driving the modulator by a second modulation signal, the second signal being for irradiating a second pattern, wherein the first pattern and the second pattern are irradiated alternately and the second pattern is different from the first pattern;

modulating reflected light from a target object, the reflected light from the target object being detected at a detector;

receiving an input of a sensing signal from the detector, wherein the detector is a lock-in detector;

modulating reflected light of the target object based on the first modulation signal; and outputting the plurality of localized illuminations for generating the image of the target object;

generating an image composed of image data from the reflected light of the plurality of localized illuminations.

16. The non-transitory computer-readable storage medium of claim 15, further comprising:

driving the modulator so a first intensity of the first pattern generating a plurality of localized illuminations is the same as or different from a second intensity of the second pattern for generating a random speckle pattern of light.

17. The non-transitory computer-readable storage medium of claim 15, further comprising:

applying the first pattern and the second pattern in a temporal sequence incident pattern; and eliminating backscattered light based on the first pattern and second pattern being irradiated alternately.

* * * * *